US012772211B2

(12) United States Patent
Elshafie et al.

(10) Patent No.: US 12,772,211 B2
(45) Date of Patent: Oct. 20, 2026

(54) TRANSMISSION PARAMETER MODIFICATION

(71) Applicant: QUALCOMM Incorporated, San Diego, CA (US)

(72) Inventors: Ahmed Elshafie, San Diego, CA (US); Diana Maamari, San Diego, CA (US); Huilin Xu, Temecula, CA (US); Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 680 days.

(21) Appl. No.: 18/158,399

(22) Filed: Jan. 23, 2023

(65) Prior Publication Data

US 2024/0251387 A1 Jul. 25, 2024

(51) Int. Cl.
*H04W 72/04* (2023.01)
*H04W 72/232* (2023.01)
*H04W 72/56* (2023.01)

(52) U.S. Cl.
CPC ......... *H04W 72/04* (2013.01); *H04W 72/232* (2023.01); *H04W 72/56* (2023.01)

(58) Field of Classification Search
CPC ... H04W 72/04; H04W 72/232; H04W 72/56; H04W 48/10
See application file for complete search history.

(56) References Cited

U.S. PATENT DOCUMENTS

2011/0228680 A1* 9/2011 Ball .................... H04W 52/367 370/328
2011/0305197 A1* 12/2011 Park ...................... H04W 24/00 370/328
2020/0221490 A1* 7/2020 Baek ..................... H04W 72/23
2021/0243779 A1* 8/2021 Takeda .................. H04L 1/1854
2021/0250134 A1* 8/2021 Islam ................... H04B 7/0626
2022/0312427 A1* 9/2022 Park .......................... H04L 1/08
2024/0244591 A1* 7/2024 Mostafa ................ H04W 72/20
2024/0276291 A1* 8/2024 Sun ....................... H04W 28/02
2025/0071816 A1* 2/2025 Oh .................... H04W 74/0833

* cited by examiner

*Primary Examiner* — Jamie J Atala
(74) *Attorney, Agent, or Firm* — ArentFox Schiff LLP

(57) ABSTRACT

Aspects are directed to method of wireless communication wherein a user equipment (UE) is configured to dynamically adjust its communication parameters for uplink transmissions. In some examples, the UE is configured to obtain a first message comprising: (1) one or more communication parameters associated with a first channel, the one or more communication parameters comprising a first communication parameter, and (2) one or more ranges of values including a range of values associated with the first communication parameter. In some examples, the UE is configured to output signaling to be transmitted via the first channel according to a first value from the range of values.

30 Claims, 12 Drawing Sheets

600

_LogicalChannelConfig_ information element

```
-- ASN1START
-- TAG-LOGICALCHANNELCONFIG-START

LogicalChannelConfig ::=           SEQUENCE {
    ul-SpecificParameters              SEQUENCE {
        priority                           INTEGER (1..16),
        prioritisedBitRate                 ENUMERATED {kBps0, kBps8, kBps16, kBps32, kBps64, kBps128, kBps256, kBps512,
                                           kBps1024, kBps2048, kBps4096, kBps8192, kBps16384, kBps32768, kBps65536, infinity},
        bucketSizeDuration                 ENUMERATED {ms5, ms10, ms20, ms50, ms100, ms150, ms300, ms500, ms1000,
                                                           spare7, spare6, spare5, spare4, spare3,spare2, spare1},
        allowedServingCells                SEQUENCE (SIZE (1..maxNrofServingCells-1)) OF ServCellIndex
                                                                                              OPTIONAL,   -- Cond PDCP-
CADuplication
        allowedSCS-List                    SEQUENCE (SIZE (1..maxSCSs)) OF SubcarrierSpacing      OPTIONAL,   -- Need R
        maxPUSCH-Duration                  ENUMERATED {ms0p02, ms0p04, ms0p0625, ms0p125, ms0p25, ms0p5, ms0p01-v1700, spare1}
                                                                                                  OPTIONAL,   -- Need R
        configuredGrantType1Allowed        ENUMERATED {true}                                      OPTIONAL,   -- Need R
        logicalChannelGroup                INTEGER (0..maxLCG-ID)                                 OPTIONAL,   -- Need R
        schedulingRequestID                SchedulingRequestId                                    OPTIONAL,   -- Need R
        logicalChannelSR-Mask              BOOLEAN,
        logicalChannelSR-DelayTimerApplied BOOLEAN,
        ...,
        bitRateQueryProhibitTimer      ENUMERATED {s0, s0dot4, s0dot8, s1dot6, s3, s6, s12, s30}  OPTIONAL,    -- Need R
        [[
        allowedCG-List-r16                 SEQUENCE (SIZE (0.. maxNrofConfiguredGrantConfigMAC-1-r16)) OF
ConfiguredGrantConfigIndexMAC-r16
                                                                                                  OPTIONAL,   -- Need S
        allowedPHY-PriorityIndex-r16       ENUMERATED {p0, p1}                                    OPTIONAL    -- Need S
        ]],
        [[
        allowedMCS-List
        allowed-deltaMCS-list
        allowedTx-Power-List
        allowedTx-delta-Power-List
    }                                                                                         OPTIONAL,   -- Cond UL
    ...,
    [[
    channelAccessPriority-r16          INTEGER (1..4)                                         OPTIONAL,   -- Need R
    bitRateMultiplier-r16              ENUMERATED {x40, x70, x100, x200}                      OPTIONAL    -- Need R
    ]]
}

-- TAG-LOGICALCHANNELCONFIG-STOP
-- ASN1STOP
```

602

FIG. 6

TRANSMISSION PARAMETER MODIFICATION

BACKGROUND

Technical Field

The present disclosure generally relates to communication systems, and more particularly, to modification of transmission parameters for wireless communication.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Certain aspects are directed to a method for wireless communications performed by an apparatus. In some examples, the method includes obtaining a first message comprising: one or more communication parameters associated with a first channel, the one or more communication parameters comprising a first communication parameter, and one or more ranges of values including a range of values associated with the first communication parameter. In some examples, the method includes outputting signaling to be transmitted via the first channel according to a first value from the range of values.

Certain aspects are directed to a method of wireless communication performed by an apparatus. In some examples, the method includes outputting, for transmission, a first message comprising: one or more communication parameters associated with a first channel, the one or more communication parameters comprising a first communication parameter, and one or more ranges of values including a range of values associated with the first communication parameter. In some examples, the method includes obtaining signaling via the first channel, the signaling obtained according to a first value from the range of values.

Certain aspects are directed to an apparatus configured for wireless communications, comprising a memory comprising instructions and one or more processors configured to execute the instructions. In some examples, the one or more processors are configured to cause the apparatus to obtain a first message comprising: one or more communication parameters associated with a first channel, the one or more communication parameters comprising a first communication parameter, and one or more ranges of values including a range of values associated with the first communication parameter. In some examples, the one or more processors are configured to cause the apparatus to output signaling to be transmitted via the first channel according to a first value from the range of values.

Certain aspects are directed to an apparatus configured for wireless communications, comprising a memory comprising instructions and one or more processors configured to execute the instructions. In some examples, the one or more processors are configured to cause the apparatus to output, for transmission, a first message comprising: one or more communication parameters associated with a first channel, the one or more communication parameters comprising a first communication parameter, and one or more ranges of values including a range of values associated with the first communication parameter. In some examples, the one or more processors are configured to cause the apparatus to obtain signaling via the first channel, the signaling obtained according to a first value from the range of values.

Certain aspects are directed to an apparatus configured for wireless communications. In some examples, the apparatus includes means for obtaining a first message comprising: one or more communication parameters associated with a first channel, the one or more communication parameters comprising a first communication parameter, and one or more ranges of values including a range of values associated with the first communication parameter. In some examples, the apparatus includes means for outputting signaling to be transmitted via the first channel according to a first value from the range of values.

Certain aspects are directed to an apparatus for wireless communications. In some examples, the apparatus includes means for outputting, for transmission, a first message comprising: one or more communication parameters associated with a first channel, the one or more communication parameters comprising a first communication parameter, and one or more ranges of values including a range of values associated with the first communication parameter. In some examples, the apparatus includes means for obtaining signaling via the first channel, the signaling obtained according to a first value from the range of values.

Certain aspects are directed to a non-transitory computer-readable medium comprising instructions that, when executed by an apparatus, cause the apparatus to perform a method. In some examples, the method includes obtaining a first message comprising: one or more communication parameters associated with a first channel, the one or more communication parameters comprising a first communication parameter, and one or more ranges of values including a range of values associated with the first communication parameter. In some examples, the method includes outputting signaling to be transmitted via the first channel according to a first value from the range of values.

Certain aspects are directed to a non-transitory computer-readable medium comprising instructions that, when executed by an apparatus, cause the apparatus to perform a method. In some examples, the method includes outputting, for transmission, a first message comprising: one or more communication parameters associated with a first channel, the one or more communication parameters comprising a first communication parameter, and one or more ranges of values including a range of values associated with the first communication parameter. In some examples, the method includes obtaining signaling via the first channel, the signaling obtained according to a first value from the range of values.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 6 is a illustration of an example LogicalChannelConfig IE used by the network node to configure logical channel parameters for communication with the UE.

DETAILED DESCRIPTION

Figure 1:
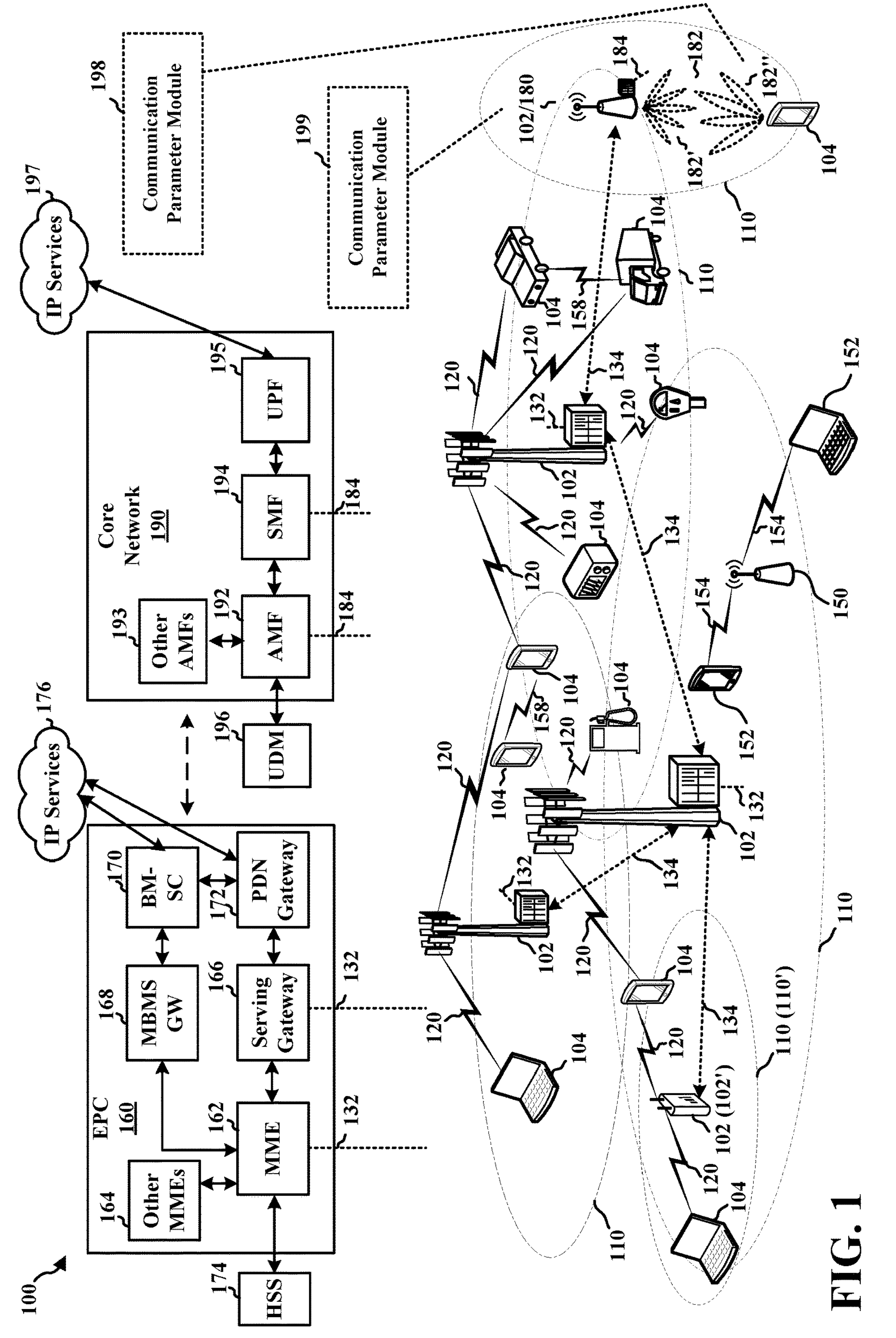
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Aspects of the disclosure are related to wireless communication enhancements. For example, changing or updating uplink transmission parameters for each logical channel or logical channel group, such as a modulation and coding scheme (MCS), a transmit power, rank of an uplink transmission, number of layers, a precoder, a beam index/direction, quasi-colocation (QCL), transmission configuration indicator (TCI), and any other suitable communication parameter, to enhance reliability of communications. Such communications may include extended reality (XR) (e.g., augmented reality (AR), virtual reality (VR), mixed reality (MR), and the like) communications.

Logical channels (LCHs) in an uplink context may be associated with a scheduling request (SR). Such an association or mapping may be configured via a Release 16 information element (IE), such as schedulingRequestID. Similarly, a list of one or more configured grants (CGs) may be associated with an LCH. Such an association may be configured via IEs such as allowedCG-List-r16 and allowed-SCS-List. Accordingly, in some examples, an association may be configured between SRs, CGs, a user of a CG, and an LCH or a logical channel group (LCG).

In certain aspects, providing a wireless device with a greater degree of flexibility of communication parameters may improve wireless communication quality and reliability. For example, aspects of the disclosure are directed to providing a wireless communication device (e.g., XR-enabling equipment such as a user equipment (UE) in a wireless communication network) with an ability to autonomously change communication parameters associated with an LCH and/or an LCG. In one example, there may be scenarios where it's useful for a UE to change a MCS it was previously assigned for transmitting uplink signaling. Such a scenario may arise if uplink data is held in a UE buffer for an extended period of time. In this case, the UE may increase the MCS of its uplink transmissions so that it can increase the rate at which buffer data is transmitted. Similarly, the UE may reduce an MCS to improve reliability for certain buffered data.

Thus, although the network may configure the UE to use a particular MCS, uplink transmission power, rank, etc., the UE may have more information than the network regarding its buffer status, which MCS would be better suited for particular data, and the like. As such, allowing the UE some autonomy to make changes to certain communication parameters may improve communications.

However, leaving the choice of one or more of MCS, uplink transmission power, and/or rank to the UE may not be ideal for the network because the network may then be forced to perform blind detection if the UE does not use the communication parameters it was assigned. As such, aspects of the disclosure are directed to constraining, per LCH and/or LCG, the degree to which a UE can modify communication parameters assigned to it by the network.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a “sub-6 GHz” band in various documents and articles. A similar nomenclature issue sometimes occurs with regard to FR2, which is often referred to (interchangeably) as a “millimeter wave” band in documents and articles, despite being different from the extremely high frequency (EHF) band (30 GHz-300 GHz) which is identified by the International Telecommunications Union (ITU) as a “millimeter wave” band.

With the above aspects in mind, unless specifically stated otherwise, it should be understood that the term “sub-6 GHz” or the like if used herein may broadly represent frequencies that may be less than 6 GHz, may be within FR1, or may include mid-band frequencies. Further, unless specifically stated otherwise, it should be understood that the term “millimeter wave” or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182''. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a communication parameter module 198 configured to obtain a first message comprising: one or more communication parameters associated with a first channel, the one or more communication parameters comprising a first communication parameter, and one or more ranges of values including a range of values associated with the first communication parameter; and output signaling to be transmitted via the first channel according to a first value from the range of values.

Referring again to FIG. 1, in certain aspects, the network node 102/180 may be configured to output, for transmission, a first message comprising: one or more communication parameters associated with a first channel, the one or more communication parameters comprising a first communication parameter, and one or more ranges of values including a range of values associated with the first communication parameter; and obtain signaling via the first channel, the signaling obtained according to a first value from the range of values.

Figures 2A, 2B, 2C, 2D:
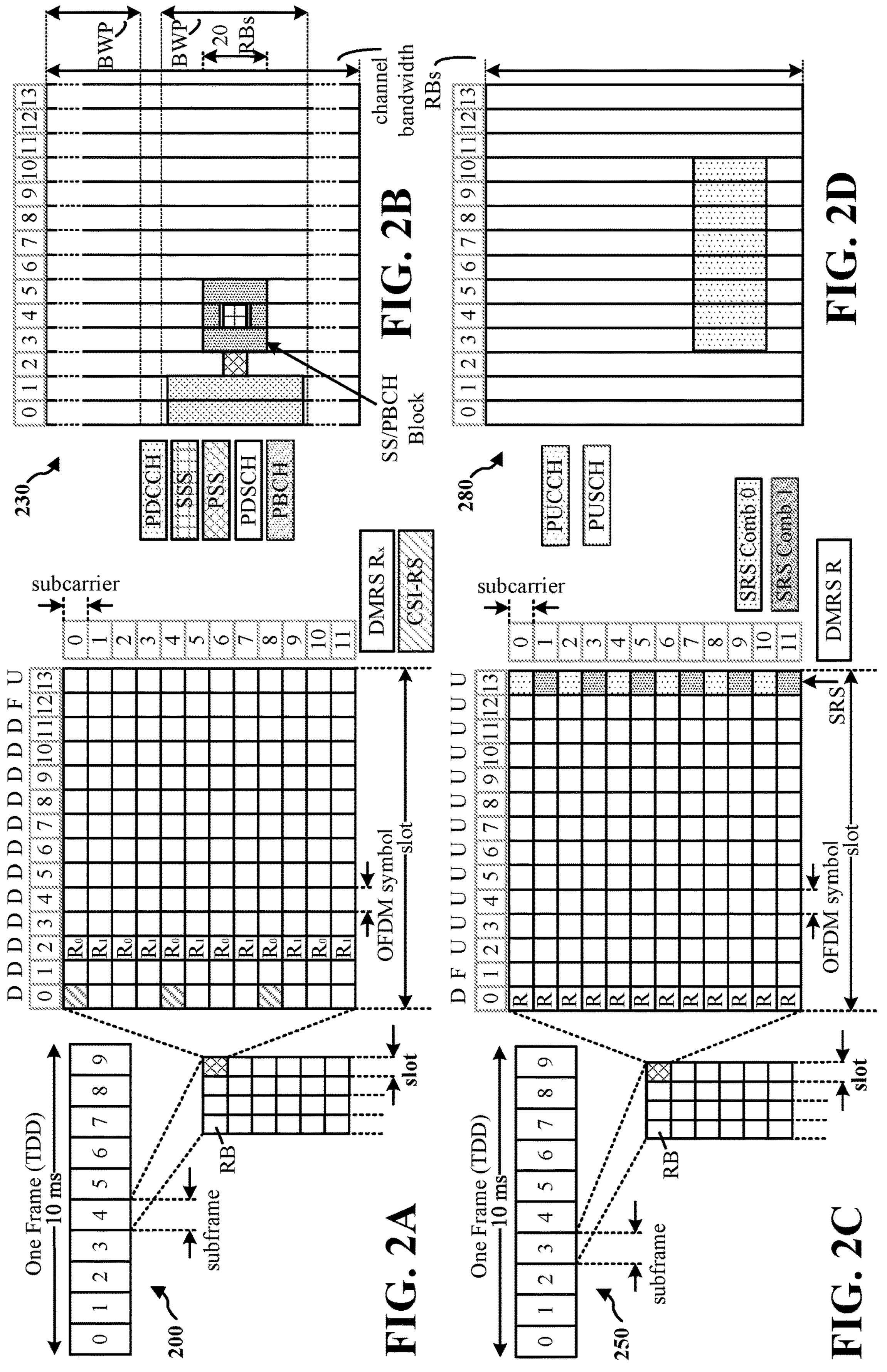
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^{\mu}$ slots/subframe. The subcarrier spacing and symbol length/duration are a function of the numerology. The subcarrier spacing may be equal to $2^{\mu}*15$ kilohertz (kHz), where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
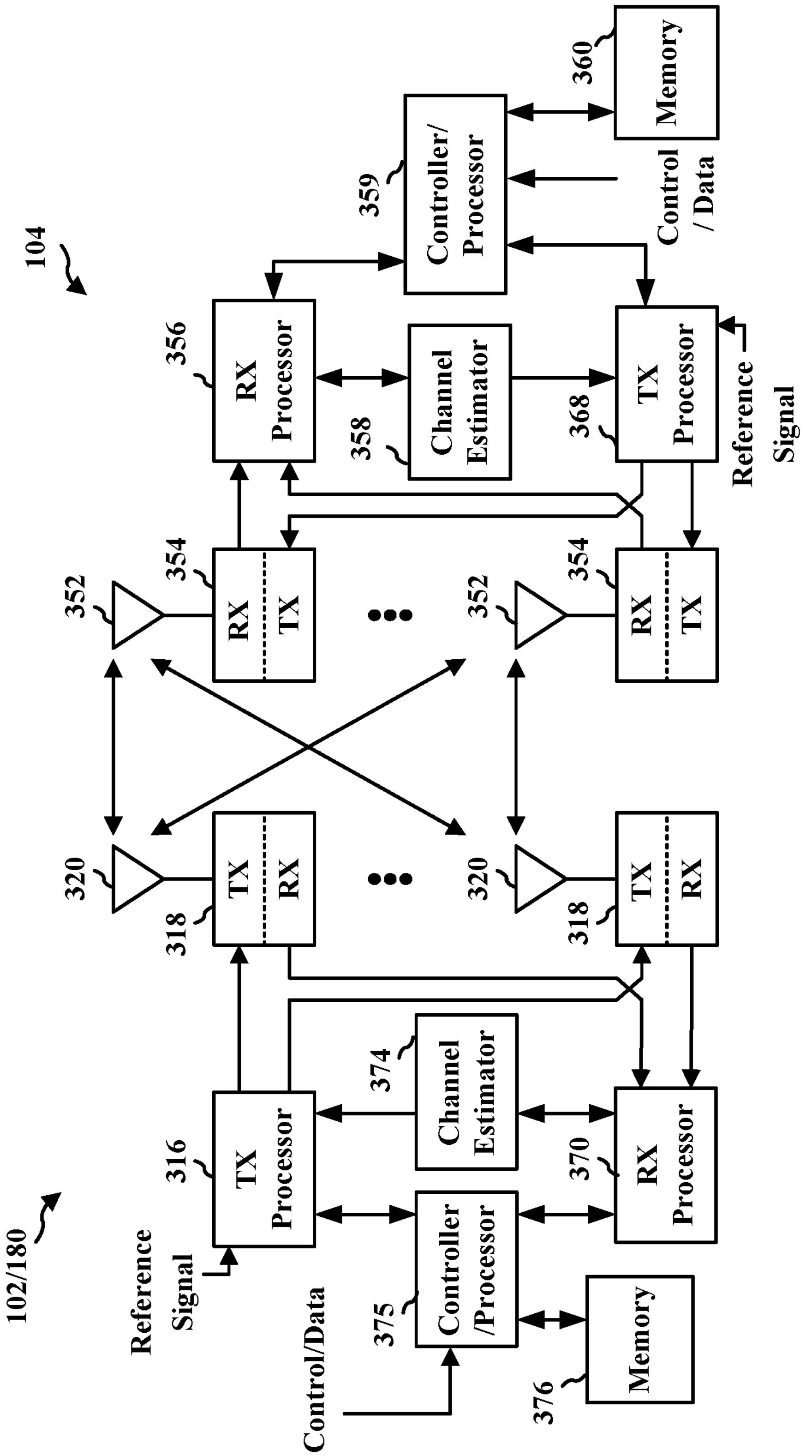
FIG. 3 is a diagram illustrating an example of a base station and user equipment (UE) in an access network.

FIG. 3 is a block diagram of a base station 102/180 in communication with a UE 104 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 104. Each spatial stream may then be provided to a different antenna 320 via a separate transmitter 318TX. Each transmitter 318TX may modulate an RF carrier with a respective spatial stream for transmission.

At the UE 104, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 104. If multiple spatial streams are destined for the UE 104, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 102/180. These soft decisions may be based on channel estimates computed by the channel estimator 358. The soft decisions are then decoded and deinterleaved to recover the data and control signals that were originally transmitted by the base station 102/180 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 102/180, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 102/180 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 102/180 in a manner similar to that described in connection with the receiver function at the UE 104. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 104. IP packets from the controller/processor 375 may be provided to the EPC 160. The controller/processor 375 is also responsible for error detection using an ACK and/or NACK protocol to support HARQ operations.

Figure 4:
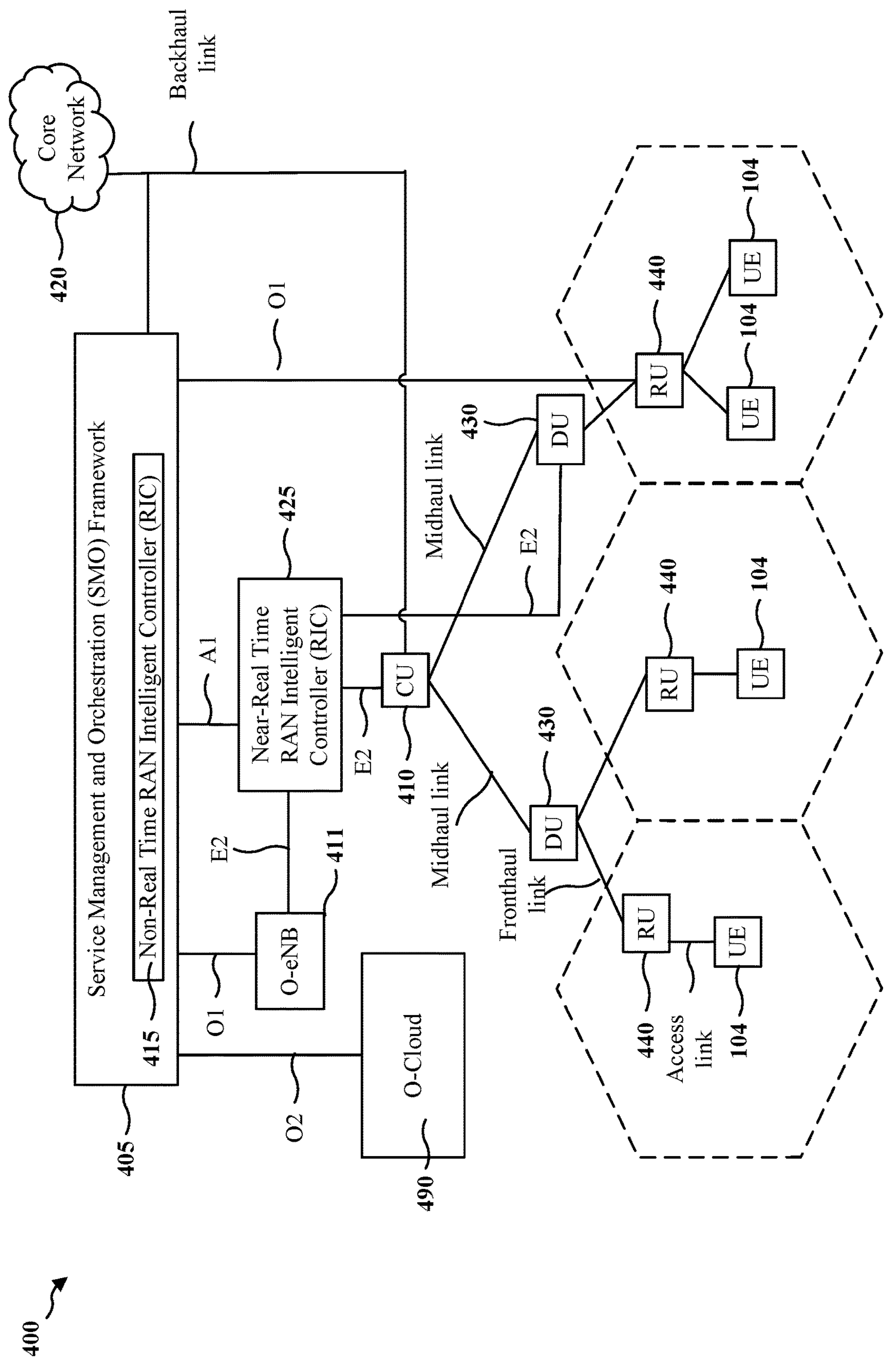
FIG. 4 is a block diagram illustrating an example disaggregated base station architecture.

FIG. 4 is a block diagram illustrating an example disaggregated base station 400 architecture. The disaggregated base station 400 architecture may include one or more CUs 410 that can communicate directly with a core network 420 via a backhaul link, or indirectly with the core network 420 through one or more disaggregated base station units (such as a near real-time (RT) RIC 425 via an E2 link, or a non-RT RIC 415 associated with a service management and orchestration (SMO) Framework 405, or both). A CU 410 may communicate with one or more DUs 430 via respective midhaul links, such as an F1 interface. The DUs 430 may communicate with one or more RUs 440 via respective fronthaul links. The RUs 440 may communicate with respective UEs 104 via one or more radio frequency (RF) access links. In some implementations, the UE 104 may be simultaneously served by multiple RUs 440.

Each of the units, i.e., the CUs 410, the DUs 430, the RUs 440, as well as the near-RT RICs 425, the non-RT RICs 415 and the SMO framework 405, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 410 may host higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 410. The CU 410 may be configured to handle user plane functionality (i.e., central unit-user plane (CU-UP)), control plane functionality (i.e., central unit-control plane (CU-CP)), or a combination thereof. In some implementations, the CU 410 can be logically split into one or more CU-UP units and one or more CU-CP units. The CU-UP unit can communicate bidirectionally with the CU-CP unit via an interface, such as the E1 interface when implemented in an O-RAN configuration. The CU 410 can be implemented to communicate with the DU 430, as necessary, for network control and signaling.

The DU 430 may correspond to a logical unit that includes one or more base station functions to control the operation of one or more RUs 440. In some aspects, the DU 430 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 430 may further host one or more low PHY layers. Each layer (or module) can be implemented with an interface configured to communicate signals with other layers (and modules) hosted by the DU 430, or with the control functions hosted by the CU 410.

Lower-layer functionality can be implemented by one or more RUs 440. In some deployments, an RU 440, controlled by a DU 430, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 440 can be implemented to handle over the air (OTA) communication with one or more UEs 104. In some implementations, real-time and non-real-time aspects of control and user plane communication with the RU(s) 440 can be controlled by the corresponding DU 430. In some scenarios, this configuration can enable the DU(s) 430 and the CU 410 to be implemented in a cloud-based RAN architecture, such as a virtual RAN (vRAN) architecture.

The SMO Framework 405 may be configured to support RAN deployment and provisioning of non-virtualized and virtualized network elements. For non-virtualized network elements, the SMO framework 405 may be configured to support the deployment of dedicated physical resources for RAN coverage requirements, which may be managed via an operations and maintenance interface (such as an O1 interface). For virtualized network elements, the SMO framework 405 may be configured to interact with a cloud computing platform (such as an open cloud (O-cloud) 490) to perform network element life cycle management (such as to instantiate virtualized network elements) via a cloud computing platform interface (such as an O2 interface). Such virtualized network elements can include, but are not limited to, CUs 410, DUs 430, RUs 440 and near-RT RICs 425. In some implementations, the SMO framework 405 can communicate with a hardware aspect of a 4G RAN, such as an open eNB (O-eNB) 411, via an O1 interface. Additionally, in some implementations, the SMO Framework 405 can communicate directly with one or more RUs 440 via an O1 interface. The SMO framework 405 also may include the non-RT RIC 415 configured to support functionality of the SMO Framework 405.

The non-RT RIC 415 may be configured to include a logical function that enables non-real-time control and optimization of RAN elements and resources, artificial intelligence/machine learning (AI/ML) workflows including model training and updates, or policy-based guidance of applications/features in the near-RT RIC 425. The non-RT RIC 415 may be coupled to or communicate with (such as via an A1 interface) the near-RT RIC 425. The near-RT RIC 425 may be configured to include a logical function that enables near-real-time control and optimization of RAN elements and resources via data collection and actions over an interface (such as via an E2 interface) connecting one or more CUs 410, one or more DUs 430, or both, as well as an O-eNB, with the near-RT RIC 425.

In some implementations, to generate AI/ML models to be deployed in the near-RT RIC 425, the non-RT RIC 415 may receive parameters or external enrichment information from external servers. Such information may be utilized by the near-RT RIC 425 and may be received at the SMO Framework 405 or the non-RT RIC 415 from non-network data sources or from network functions. In some examples, the non-RT RIC 415 or the near-RT RIC 425 may be configured to tune RAN behavior or performance. For example, the non-RT RIC 415 may monitor long-term trends and patterns for performance and employ AI/ML models to perform corrective actions through the SMO Framework 405 (such as reconfiguration via O1) or via creation of RAN management policies (such as A1 policies).

At least one of the TX processor 368, the RX processor 356, and the controller/processor 359 may be configured to perform aspects in connection with the communication parameter module 198 of FIG. 1.

At least one of the TX processor 316, the RX processor 370, and the controller/processor 375 may be configured to perform aspects in connection with 199 of FIG. 1.

Examples of Allowed Transmission Parameters

In certain aspects, providing a wireless device with a greater degree of flexibility of communication parameters may improve wireless communication quality and reliability. For example, aspects of the disclosure are directed to providing a wireless communication device (e.g., XR-enabled equipment such as a UE) with an ability to autonomously change communication parameters associated with an LCH and/or an LCG. In one example, there may be scenarios where it's useful for a UE to change an MCS it was previously assigned for transmitting uplink signaling. Such a scenario may arise if uplink data is held in a UE buffer for an extended period of time. In this case, the UE may increase the MCS of its uplink transmissions so that it can increase the rate at which buffer data is transmitted. Similarly, the UE may reduce an MCS to improve reliability for certain buffered data. This particular example relates to an MCS, but other communication parameters may also be adjusted or modified by the UE within a range configured by the network node.

Thus, although the network may configure the UE to use a particular communication parameter, the UE may have more information than the network regarding its buffer status. Accordingly, the UE may be in a better position to determine whether to modify one or more assigned communication parameters. As such, allowing the UE some autonomy to make changes to certain communication parameters may improve communications.

However, leaving the decision to update a communication parameter to the UE may not be ideal for the network because the network may then be forced to perform blind detection/decoding if the UE does not use the communication parameters the network assigned it. As such, aspects of the disclosure are directed to constraining, per LCH and/or LCG, the degree to which a UE can modify communication parameters assigned to it by the network.

Uplink traffic, such as uplink video traffic, may be communicated via bursts of packets. For example, a set of packets generated by an application (app) or program at roughly the same time. In an XR context, a packet data unit (PDU) may be used to carry XR-related data. A PDU set may include one or more PDUs each carrying a payload of one unit of information generated at the application level (e.g., a frame or video slice).

Figure 5:
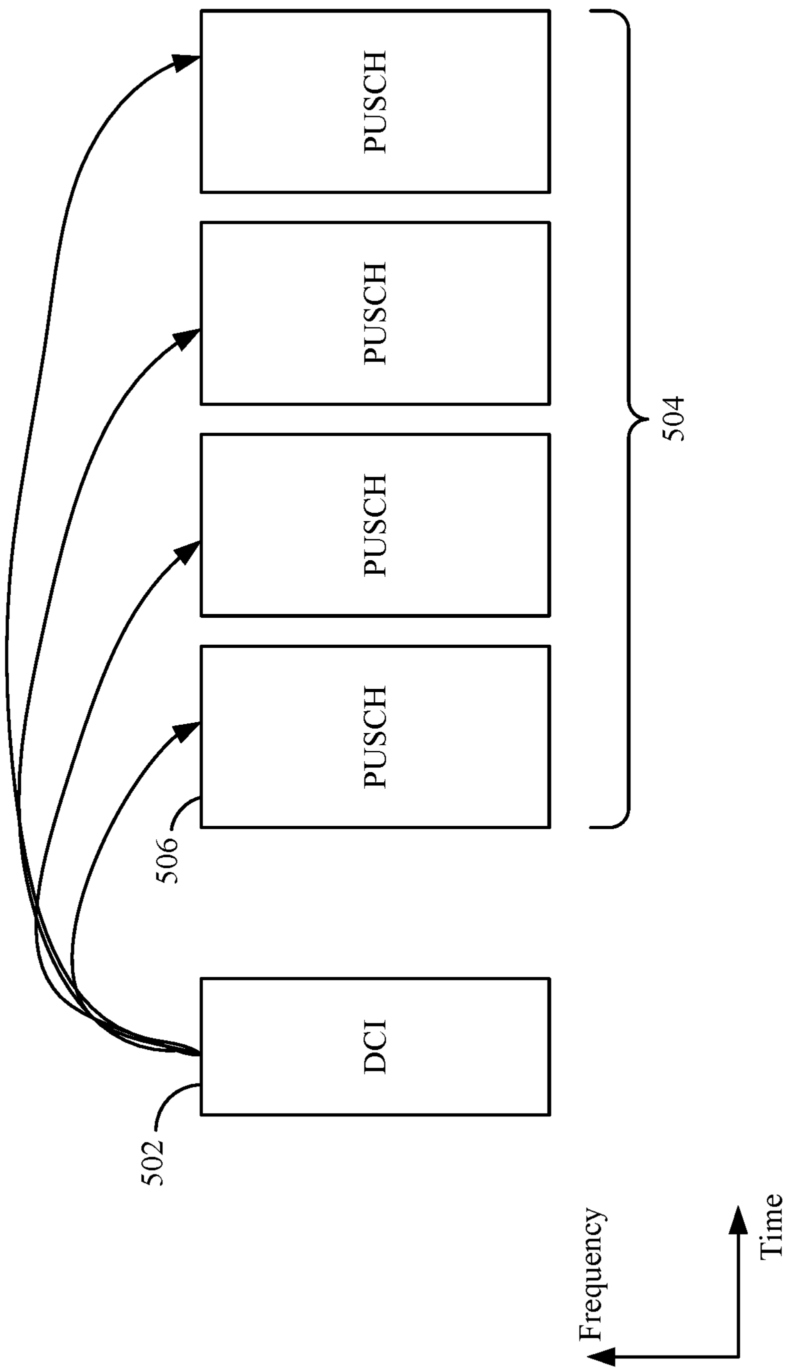
FIG. 5 is a block diagram illustrating an example PDU set.

In some examples, a packet delay budget (PDB) for a burst transmission or set of packets may not be transmitted with the correct key performance indicator (KPI) for a burst transmission. However, a PDB that is defined on the level of burst or group of packets is a better KPI for certain data units such as XR. For burst transmission, at the PHY layer a network node (e.g., base station) may grant a UE multi-PUSCH transmissions using a single DCI for burst transmission. FIG. 5 is a block diagram illustrating an example PDU set 504. Here, a DCI 502 is transmitted to the UE scheduling the UE for uplink communications in the form of a burst transmission (e.g., PDU set 504). The burst transmission includes multiple PUSCH 506 resources.

Adaptation of communication parameters (e.g., MCS, uplink transmit power, uplink rank, number of layers, precoder, beam index/direction, QCL, TCI, and any other suitable communication parameter) in the uplink direction is useful because the UE may have more information about its buffer status and uplink status than the network node. For example, if a packet remains in the UE buffer for too much time, the UE may increase the MCS it uses so that is may transmit as much data bits as possible within a time window. In another scenario, if the UE is transmitting high reliability data, it may determine to reduce a high MCS to a relatively lower MCS to transmit a packet with increased reliability.

Aspects of the disclosure are directed to methods and techniques for a network node to configure a UE with a range of values it can use for various communication parameters. FIG. 6 is a illustration of an example LogicalChannelConfig IE 600 used by the network node to configure logical channel parameters for communication with the UE. In this example, the LogicalChannelConfig IE 600 includes a set 602 one or more lists and/or deltas corresponding to different communication parameters. In this example, the set 602 includes an allowedMCS-List, allowed-deltaMCS-list, allowedTx-Power-List, and allowedTx-delta-Power-List. Each of these lists may be associated with a particular LCH or all the LCHs of an LCG. It should be noted that although the illustrated set 602 includes lists for communication parameters MCS and transmit power, other communication parameters may be included.

Here, the lists labeled as "allowedMCS-List" and "allowedTx-Power-List" may include a list of MCS and transmit power indices that the UE can use if it determines to change the MCS or transmit power from the assigned MCS or transmit power. In other words, the network node may configure the UE with an assigned MCS and uplink transmit power to use for uplink communications, as well as a list of other MCSs and transmit powers that the UE can use if it determines an MCS or transmit power other than that assigned would be more appropriate. In one example, an allowedMCS-List may be MCS 15-19. In this example, the UE may use an MCS associated with range of MCS indices 15-19. In some examples, the assigned value of the communication parameter may be included in the list. As noted above, any other range of communication parameter values may be indicated in such a list.

The lists labeled as "allowed-deltaMCS-list" and "allowedTx-delta-Power-List" may include a delta value (e.g., 3) indicative of a delta from an assigned value. For example, if the assigned transmit power value is 15 (e.g., 15 being an index corresponding to a particular transmit power), and the delta value is 3, then the UE may use range of transmit power indices 12-18. As noted above, any other range of communication parameter values may be indicated in such a delta value.

Figure 7:
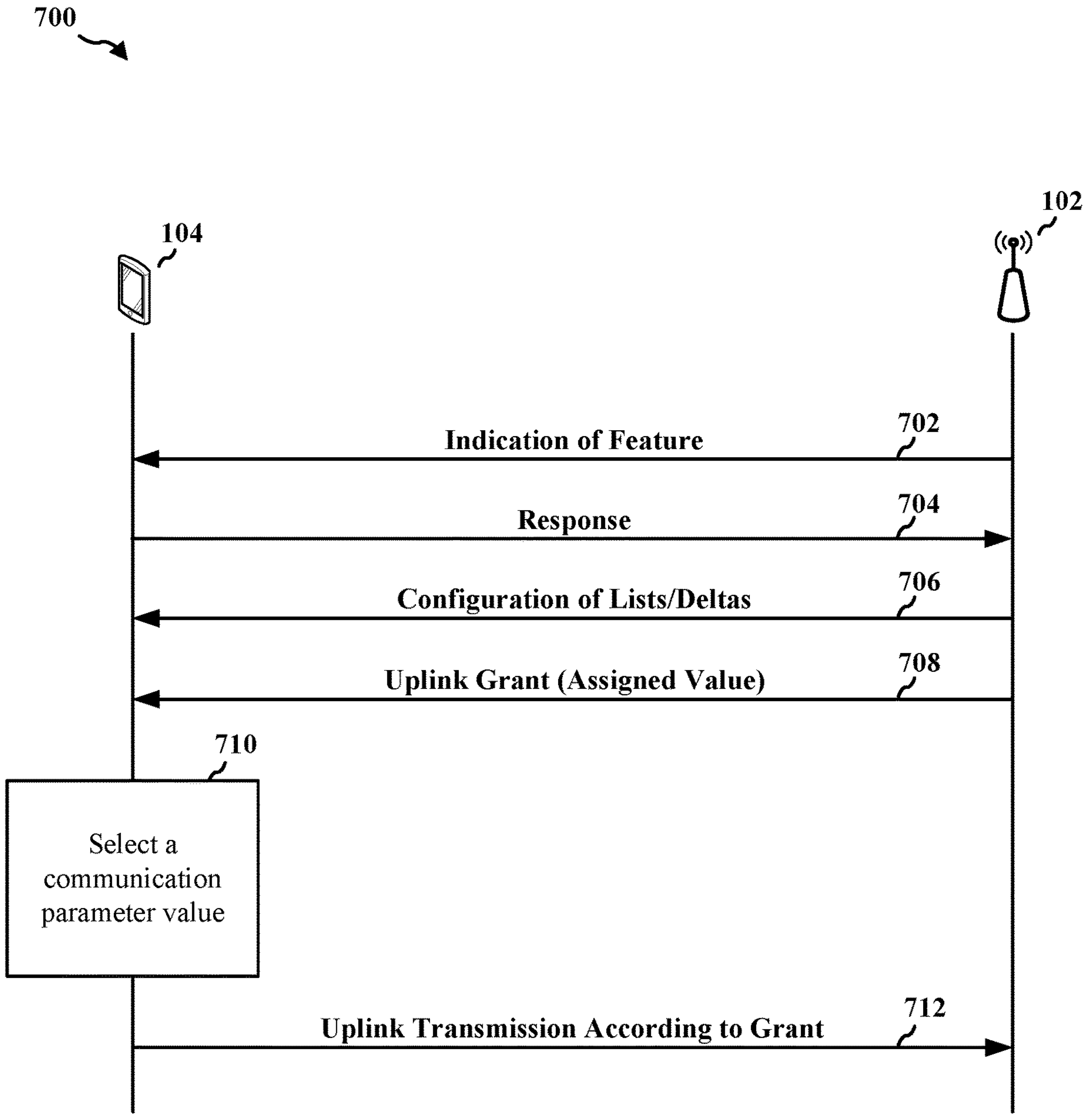
FIG. 7 is a call-flow diagram illustrating example communications between a UE and a network node.

FIG. 7 is a call-flow diagram illustrating example communications 700 between a UE 104 and a network node 102.

At an optional first communication 702, the network node 102 may transmit an indication that it is capable of providing the UE 104 with a range of values associated with one or more communication parameters. That is, the network node 102 may be capable of providing the UE 104 with a range of values for one or more communication parameters that the UE 104 may use as an alternative to an assigned communication parameter value. The one or more communication parameters may include at least one of an MCS, a transmit power, a transmit beam, a transmit precoder, a QCL, a TCI state, a transmit rank, and/or any other suitable parameter.

The network node 102 may be capable of providing the UE 104 with a range of one or more values associated with one or more of the communication parameters. The range of values provide the UE with a communication parameter value that may be used as an alternative to a value assigned by the network node 102 (e.g., in an uplink grant). Thus, the UE 104 may receive an indication that the network node 102 is configured to receive an uplink transmission according to any value of the range of values indicated by the network node 102.

In some examples, the range of values may include a contiguous sequence of multiple values including an assigned value. For example, the network node 102 may configure the UE 104 with range of MCS indices 13-19. The network node 102 may later transmit a grant to the UE 104 assigning MCS index value 15. In this example, the UE 104 may use the assigned value unless it determines that a different value within the range of values would be more appropriate. In some examples, the range of values may be indicated via a delta. For example, the network node 102 may provide a delta value of 3, which the UE 104 may use to determine a range with respect to an assigned value. Here, if the network node 102 provides a delta of 3 for MCS, and the assigned MCS value is 15, then the range of MCS index values provided by the network node 102 include MCS indices 12-18.

In some examples, the network node 102 may not transmit an indication of its capability. Instead, the network node may simply configure the UE 104 (e.g., as described in a third communication 706). In this example, the UE 104 may use the alternative range of values if it is capable. Otherwise, the UE 104 may ignore that aspect of the IE.

The first communication 702 may be transmitted to the UE 104 via a master information block (MIB), a system information block #1 (SIB1), other SIBs (OSIBs), a message during a random-access channel (RACH) procedure (e.g., msg 1/3 in 4-step RACH or msgA in 2-step RACH), multiplexed with a RACH message, or in any suitable messaging format.

In an optional second communication 704, the UE 104 may respond to the network node 102 indicating that it is capable of selecting a communication parameter value from a range of values configured by the network node 102.

At a third communication 706, the network node 102 may transmit a configuration message (e.g., LogicalChannelConfig IE 600 of FIG. 6) to the UE 104, configuring the UE 104 with ranges of values and/or deltas associated with one or more communication parameters. The configuration message may include an indication of which LCHs and/or LCGs the ranges of values and deltas may be associated with. For example, a first range may be associated with a first LCH/first LCG, whereas a second range may be associated with a second LCH/second LCG. If a range is associated with an LCG, then the UE 104 may associate the range with each LCH of that LCG. Otherwise, if the range is associated with a particular LCH, then the UE 104 may use the range only with that LCH. Accordingly, the third communication 706 may provide the UE 104 with an indication of one or more communication parameters, and one or more ranges of values associated with each of the one or more communication parameters. In some examples, the third communication 706 may include a radio resource control (RRC) message, a downlink control information (DCI) message, or a medium-access control (MAC) control element (CE).

In some examples, the third communication 706 may transmitted via a configured grant (CG) configuration. That is, the network node 102 may configure the UE 104 for CG uplink transmissions and provide the UE 104 with one or more communication parameters and associated ranges values as part of the CG configuration.

At a fourth communication 708 the network node may transmit an uplink grant (e.g., DCI) to the UE 104. The uplink grant may include an assigned value for one or more communication parameters. If the uplink grant schedules the UE 104 to transmit over an LCH or LCG associated with a range of values for one or more communication parameters, then the UE may use the assigned value or select an alternative value from the range of values. For example, the network node 102 may configure the UE 104 with a range of MCS values (e.g., indices associated with the MCS) that the UE 104 can use on a particular LCH. If the uplink grant schedules the UE 104 to transmit using that LCH, then the UE 104 may transmit the uplink using the assigned MCS provided in the uplink grant, or the UE 104 may select an alternative MCS within the range of values provided in the third communication 706.

In certain aspects, the third communication 706 and the fourth communication 708 may be consolidated into a single communication. That is, the network node 102 may transmit a single communication (e.g., DCI) that includes: (1) an indication of one or more communication parameters, (2) an indication of a range and/or delta associated with each of the one or more communication parameters, and (3) and one or more assigned values for one or more communication parameters.

It should be noted that the uplink grant may grant a multi-PUSCH transmission via a single DCI. For multi-PUSCH transmissions using single DCI, a parameter index (e.g., priority index) in the DCI can be associated with a range of values or a delta value for one or more communication parameters. In some examples, an association between the parameter index of the DCI and the communication parameter may be configured via the third communication 706 (e.g., via RRC or CG configuration). Thus, the UE 104 may obtain a mapping between indices of a DCI message and: (1) a corresponding communication parameter, and (2) values within the range of values for the corresponding communication parameter.

Thus, the network node 102 may provide the UE 104 with an indication of a parameter index to dynamically change a corresponding communication parameter with no additional signaling overhead. For example, if the parameter index of the DCI that provides multi-PUSCH resources is set too high, the UE 104 may dynamically change the MCS of one or more of the PUSCH resources by a delta indicated by the third communication 706. Such a procedure may be useful to reduce additional signaling from the network node 102 because the UE 104 can make the changes on its own.

In another example, a single DCI may schedule multiple uplink transmissions, but a single DCI cannot adapt communication parameters (e.g., MCS) based on the delay budget (e.g., packet delay budget (PDB); representative of the packet transmission delay from the UE 104 to the network node 102). Thus, in some examples, the network node 102 may transmit an L1/L2/L3 or DCI message indicating a time or transmission number "n" configured to indicate when the UE is to change from an assigned communication parameter value to a communication parameter value indicated by the DCI parameter index.

In another example, the network node 102 may restrict the UE (e.g., via a L1/L2/L3 indication or as part of the third communication 706) to use a subset of values within the range of values provided in the third communication 706. For example, the network node 102 may restrict the UE 104 to the subset of values within the range for an indicated amount of time, then after the amount of time has passed, the UE 104 may be allowed to use the entire range of values. Conversely, the UE 104 may initially be able to use the entire range of values for a communication parameter, but after one or more durations of time, the range of values may be limited. Such a timing condition may be configured by the third communication 706 (e.g., via RRC or as a CG configuration), and may be applied to a specific LCH and/or each LCH of an LCG.

At a first process 710, the UE 104 may determine whether to use an assigned value or a range value for a communication parameter of an uplink transmission. For example, the UE 104 may select a communication parameter value from the range of values or it may select the assigned value based on information such as buffer status, channel quality, QoS, and any other suitable information.

At a fifth communication 712, the UE 104 may transmit an uplink communication to the network node 102 using the resources scheduled to it via the uplink grant of the fourth communication 708. The uplink communication may be transmitted using one or more assigned values and/or range values for one or more communication parameters.

It should be noted that if the UE 104 uses a range value provided to it in the third communication 706 instead of an assigned value from the fourth communication 708, the network node 102 may have to perform blind decoding to determine which range value was used. Thus, in order to reduce or eliminate blind decoding, the UE 104 may provide an indication of one or more range values used to the network node 102.

In one example, the UE 104 may provide, to the network node 102, an indication of the one or more range values via L1/L2/L3 communications prior to the uplink transmission of the fifth communication 712. This way the network node 102 has information indicating that one or more assigned values were not used, and information identifying which values from the configured range of values were used.

Figure 8A:
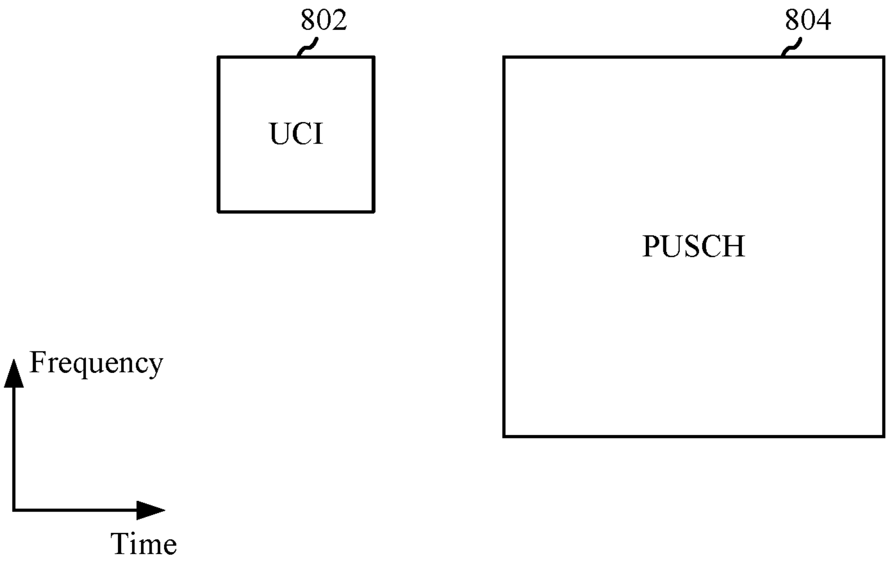
FIGS. 8A and 8B are block diagrams illustrating two example methods for providing the network node with an indication of the one or more range values.
Figure 8B:
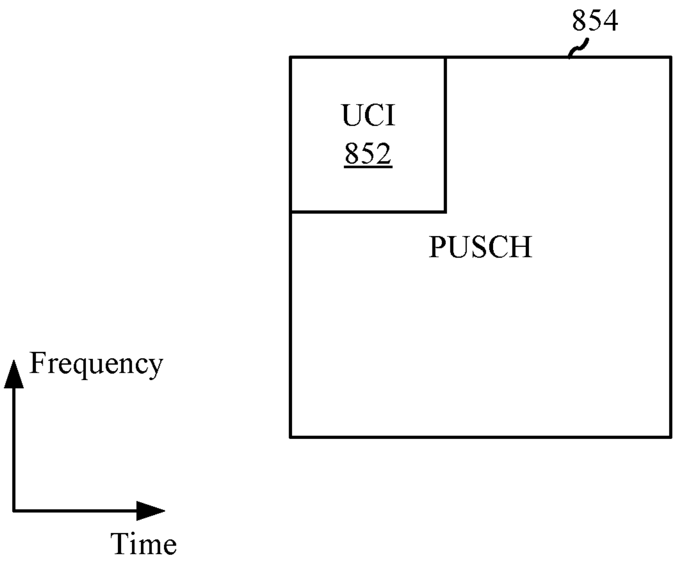

In another example, the UE 104 may provide an indication of the one or more range values in an L1/L2/L3 communication during the uplink transmission, or the indication may be multiplexed within the uplink transmission. FIGS. 8A and 8B are block diagrams illustrating two example methods for providing the network node 102 with an indication of the one or more range values.

FIG. 8A conceptually illustrates an example of an uplink control information (UCI) 802 message transmitted by a UE (e.g., UE 104) prior to transmission of a PUSCH 804. In this example, the UE 104 may determine to use a range value for a communication parameter when it transmits the PUSCH 804 instead of an assigned value. As such, prior to transmitting the PUSCH 804, the UE 104 may transmit the UCI 802 with an indication of the range value. The UCI 802 may be transmitted according to the any communication parameter values assigned by the network node 102. In this example, the UCI 802 may be piggybacked with any L1/L2/L3 (e.g., SR, BSR, HARQ-ACK, CG-UCI, CSI, PHR, etc.) transmitted prior the PUSCH 804 transmission, or before changing the assigned value to the range value.

FIG. 8B conceptually illustrates an example of a UCI 852 message multiplexed with a PUSCH 854. Here, the UCI 852 may indicate the range value and corresponding communication parameter that the remaining portion of the PUSCH 854 will use for its transmission. In some examples, the UCI 852 may be transmitted using the assigned values for all communication parameters.

Figure 9:
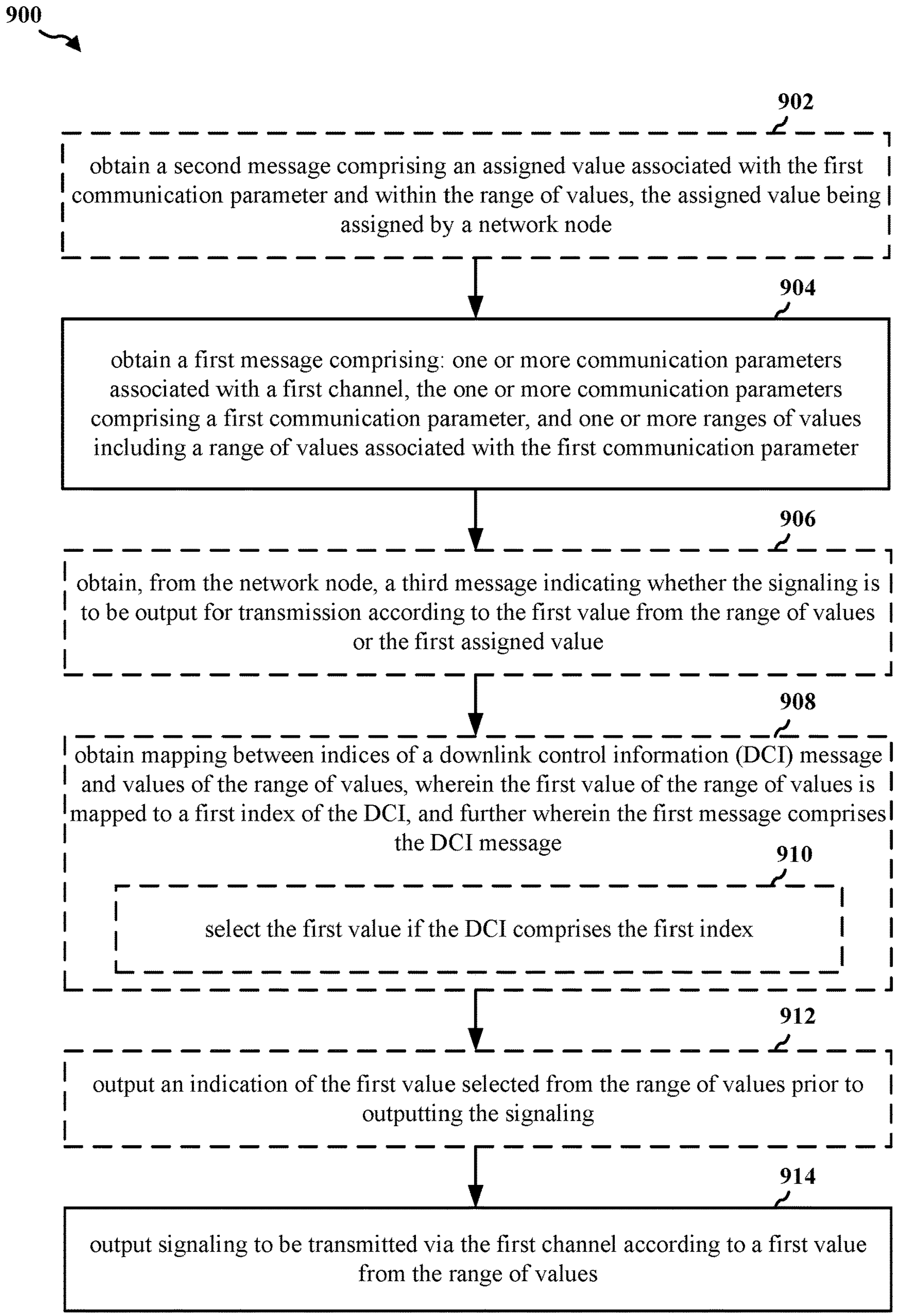
FIG. 9 is a flowchart of a method of wireless communication.

FIG. 9 is a flowchart 900 of a method of wireless communication. The method may be performed by a UE (e.g., the UE 104; the apparatus 1002). At 902, the UE may obtain a second message comprising an assigned value associated with the first communication parameter and within the range of values, the assigned value being assigned by a network node. For example, 902 may be performed by an obtaining component 1040. Here, the UE may receive, from a network node, an indication of one or more assigned values for communication parameters that the UE may use for transmitting an uplink message to the network node. In this example, the assigned value may be within a range of values that the UE is configured with.

At 904, the UE may obtain a first message comprising: one or more communication parameters associated with a first channel, the one or more communication parameters comprising a first communication parameter, and one or more ranges of values including a range of values associated with the first communication parameter. For example, 904 may be performed by the obtaining component 1040. Here, the UE may receive an indication of communication parameters associated with an uplink transmission, and a range or a delta value for each of the communication parameters.

At 906, the UE may obtain, from the network node, a third message indicating whether the signaling is to be output for transmission according to the first value from the range of values or the first assigned value. For example, 906 may be performed by the obtaining component 1040. Here, the network node may transmit the third message to the UE to indicate to the UE whether it can use a range value, or if it will need to use the assigned value. In other words, the network node may dynamically control whether the UE can use the configured range values, or if it has to use the assigned values.

At 908, the UE may obtain mapping between indices of a downlink control information (DCI) message and values of the range of values, wherein the first value of the range of values is mapped to a first index of the DCI, and further wherein the first message comprises the DCI message. For example, 908 may be performed by the obtaining component 1040. Here, the network node may configure the UE with a mapping between values contained in a DCI (e.g., index values) and values associated with a communication parameter. For example, each value in a range of index values in a DCI may correspond to a separate value for a communication parameter (e.g., MCS). Thus, if the DCI index has a particular value, the UE may set the communication parameter with a corresponding value for an uplink transmission. Here, the DCI may be the grant that provides a schedule for the uplink transmission.

At 910, the UE may select the first value if the DCI comprises the first index. For example, 910 may be performed by a selecting component 1042. Here, if the DCI has an index value that maps to a communication parameter value, the UE may set the communication parameter to that value. For example, the DCI index value may map to a MCS index value 15. Thus, for the uplink transmission granted by the DCI, the UE will use the MCS associated with MCS index value 15.

At 912, the UE may output an indication of the first value selected from the range of values prior to outputting the signaling. For example, 912 may be performed by an outputting component 1044. Here, the UE may transmit an uplink indication (e.g., a UCI) to the network node prior to transmitting data (e.g., PUSCH). The indication may be configured to provide the network node with an indication of one or more communication parameter values that the UE will use for transmitting the data.

At 914, the UE may output signaling to be transmitted via the first channel according to a first value from the range of values. For example, 914 may be performed by the outputting component 1044. Here, the UE may transmit an uplink message according to a selected value of a communication parameter.

In certain aspects, the range of values comprises: a contiguous sequence of multiple values including the first an assigned value; or a delta associated with the first assigned value, the assigned value being assigned by a network node with which the apparatus communicates.

In certain aspects, the first message is a radio resource control (RRC) message, a downlink control information (DCI) message, or a medium-access control (MAC) control element (CE).

In certain aspects, the one or more communication parameters comprise at least one of a modulation and coding scheme (MCS), a transmit power, a transmit beam, a transmit precoder, a quasi-colocation (QCL), a transmission configuration indicator (TCI) state, or a transmit rank.

In certain aspects, the indication is part of: a master information block (MIB), a system information block (SIB), other SIBs (OSIBs), or a random access channel message.

In certain aspects, the third message is obtained via layer-1 (L1), layer-2 (L2), or layer-3 (L3) signaling.

In certain aspects, the first message and the second message are obtained via a same downlink control information (DCI).

In certain aspects, the second message is an uplink grant.

In certain aspects, the one or more communication parameters are further associated with a second channel, wherein the first channel forms at least a portion of a first logical channel group (LCG), and wherein the second channel forms at least a portion of a second LCG.

In certain aspects, the one or more communication parameters are further associated with a second channel, and wherein the first channel and the second channel form at least a portion of a first logical channel group (LCG).

In certain aspects, the first message comprises a configured grant (CG) configuration message.

In certain aspects, the mapping is obtained via a radio resource control (RRC) message.

In certain aspects, the indices of the DCI message are priority indices.

Figure 10:
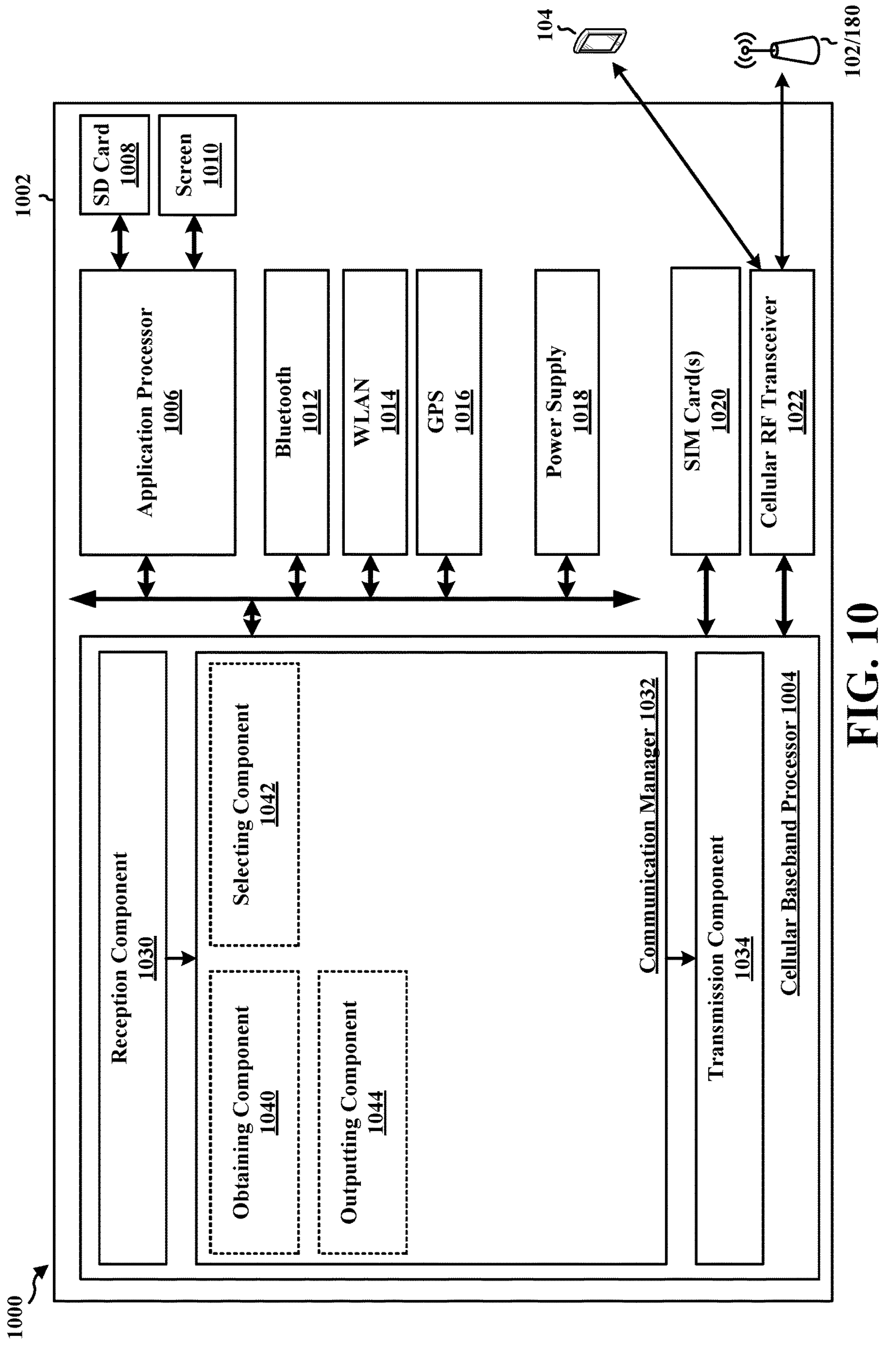
FIG. 10 is a diagram illustrating an example of a hardware implementation for an example apparatus.

FIG. 10 is a diagram 1000 illustrating an example of a hardware implementation for an apparatus 1002. The apparatus 1002 is a UE and includes a cellular baseband processor 1004 (also referred to as a modem) coupled to a cellular RF transceiver 1022 and one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, and a power supply 1018. The cellular baseband processor 1004 communicates through the cellular RF transceiver 1022 with the UE 104 and/or BS 102/180. The cellular baseband processor 1004 may include a computer-readable medium/memory. The computer-readable medium/memory may be non-transitory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 104 and may include the memory 360 and/or at least one of the TX processor 368, the RX processor 356, and the controller/processor 359. In one configuration, the apparatus 1002 may be a modem chip and include just the baseband processor 1004, and in another configuration, the apparatus 1002 may be the entire UE (e.g., see 104 of FIG. 3) and include the aforediscussed additional modules of the apparatus 1002.

The communication manager 1032 includes an obtaining component 1040 that is configured to: obtain a second message comprising an assigned value associated with the first communication parameter and within the range of values, the assigned value being assigned by a network node; obtain a first message comprising: one or more communication parameters associated with a first channel, the one or more communication parameters comprising a first communication parameter, and one or more ranges of values including a range of values associated with the first communication parameter; obtain, from the network node, a third message indicating whether the signaling is to be output for transmission according to the first value from the range of values or the first assigned value; and obtain mapping between indices of a downlink control information (DCI) message and values of the range of values, wherein the first value of the range of values is mapped to a first index of the DCI, and further wherein the first message comprises the DCI message; e.g., as described in connection with 902, 904, 906, and 908 of FIG. 9.

The communication manager 1032 further includes a selecting component 1042 configured to select the first value if the DCI comprises the first index, e.g., as described in connection with 910 of FIG. 9.

The communication manager 1032 further includes an outputting component 1044 configured to output an indication of the first value selected from the range of values prior to outputting the signaling; output signaling to be transmitted via the first channel according to a first value from the range of values, e.g., as described in connection with 912 and 914 of FIG. 9.

The apparatus may include additional components that perform each of the blocks of the algorithm in the aforementioned flowchart of FIG. 9. As such, each block in the aforementioned flowchart may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the cellular baseband processor 1004, includes means for obtaining a second message comprising an assigned value associated with the first communication parameter and within the range of values, the assigned value being assigned by a network node; means for obtaining a first message comprising: one or more communication parameters associated with a first channel, the one or more communication parameters comprising a first communication parameter, and one or more ranges of values including a range of values associated with the first communication parameter; means for obtaining, from the network node, a third message indicating whether the signaling is to be output for transmission according to the first value from the range of values or the first assigned value; means for obtaining mapping between indices of a downlink control information (DCI) message and values of the range of values, wherein the first value of the range of values is mapped to a first index of the DCI, and further wherein the first message comprises the DCI message; means for selecting the first value if the DCI comprises the first index; means for outputting an indication of the first value selected from the range of values prior to outputting the signaling; and means for outputting signaling to be transmitted via the first channel according to a first value from the range of values.

The aforementioned means may be one or more of the aforementioned components of the apparatus 1002 configured to perform the functions recited by the aforementioned means. As described supra, the apparatus 1002 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 11:
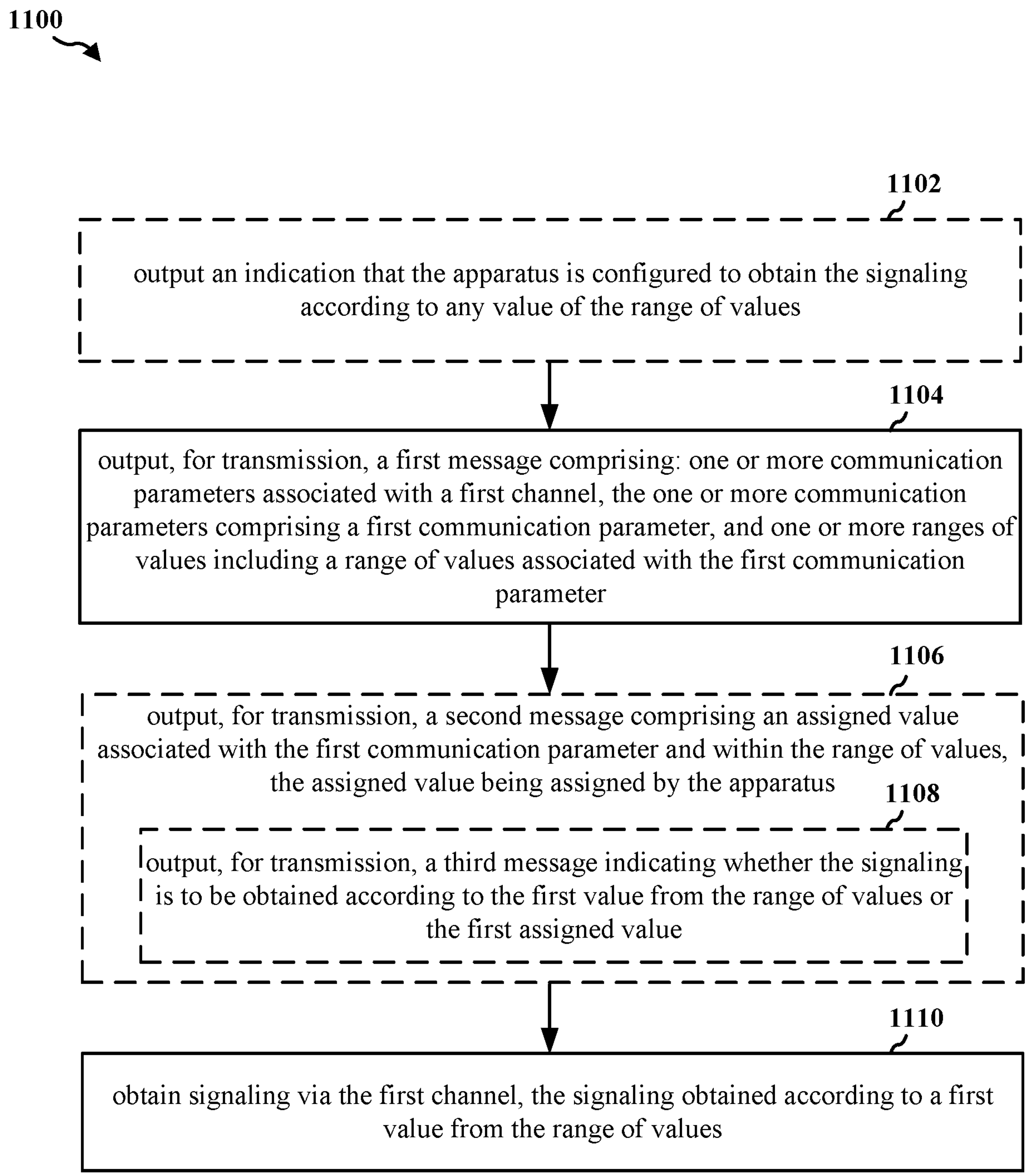
FIG. 11 is a flowchart of a method of wireless communication.

FIG. 11 is a flowchart 1100 of a method of wireless communication. The method may be performed by a network node or base station (e.g., the base station 102/180; the apparatus 1202. At 1102, the network node may output an indication that the apparatus is configured to obtain the signaling according to any value of the range of values. For example, 1102 may be performed by an outputting component 1240.

At 1104, the network node may output, for transmission, a first message comprising: one or more communication parameters associated with a first channel, the one or more communication parameters comprising a first communication parameter, and one or more ranges of values including a range of values associated with the first communication parameter. For example, 1104 may be performed by the outputting component 1240.

At 1106, the network node may output, for transmission, a second message comprising an assigned value associated with the first communication parameter and within the range of values, the assigned value being assigned by the apparatus. For example, 1106 may be performed by the outputting component 1240.

At 1108, the network node may output, for transmission, a third message indicating whether the signaling is to be obtained according to the first value from the range of values or the first assigned value. For example, 1108 may be performed by the outputting component 1240.

At 1110, the network node may obtain signaling via the first channel, the signaling obtained according to a first value from the range of values. For example, 1110 may be performed by an obtaining component 1242.

Figure 12:
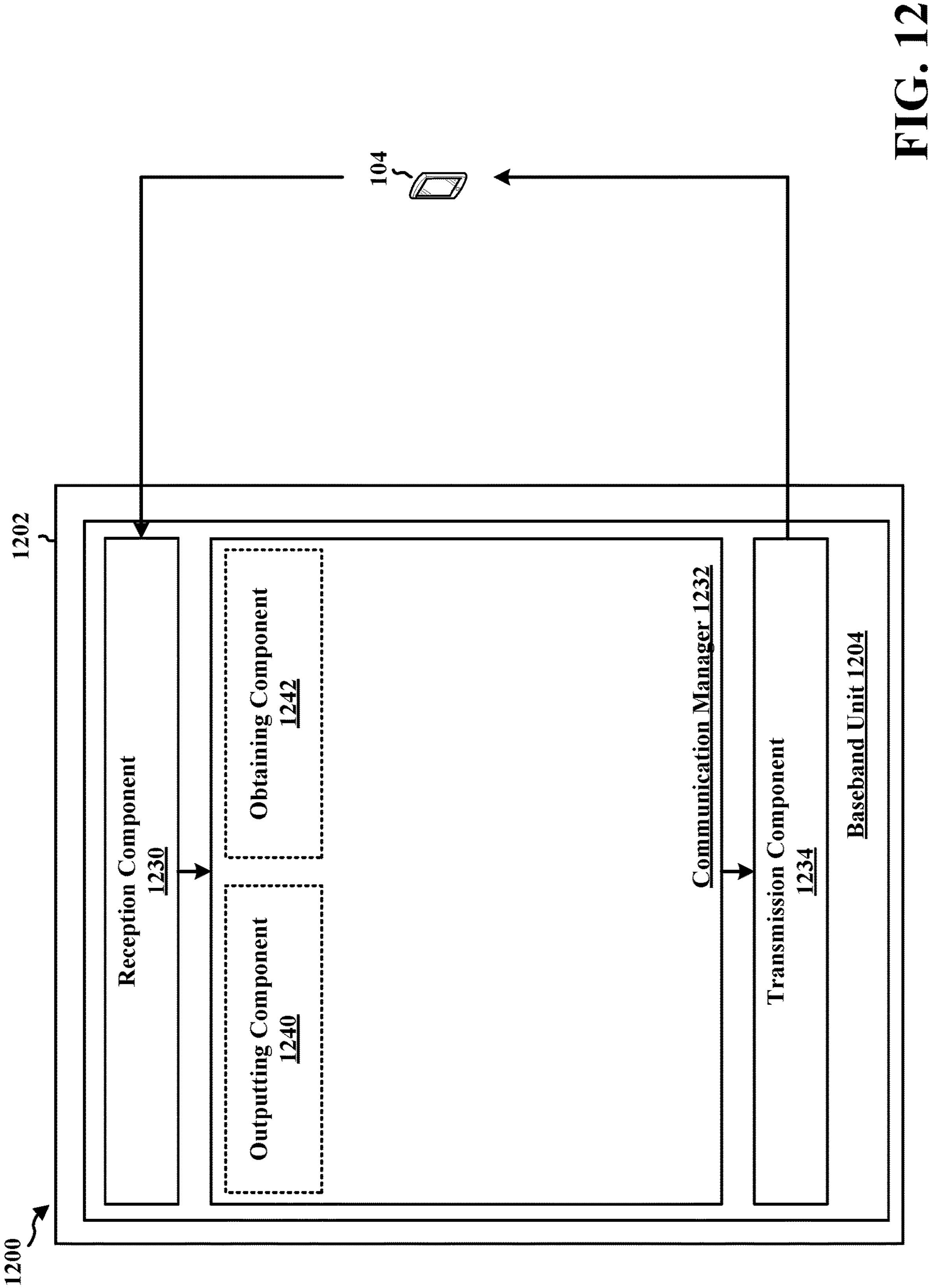
FIG. 12 is a diagram illustrating another example of a hardware implementation for another example apparatus.

FIG. 12 is a diagram 1200 illustrating an example of a hardware implementation for an apparatus 1202. The apparatus 1202 is a BS and includes a baseband unit 1204. The baseband unit 1204 may communicate through a cellular RF transceiver with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the BS 102/180 and may include the memory 376 and/or at least one of the TX processor 316, the RX processor 370, and the controller/processor 375.

The communication manager 1232 includes an outputting component 1240 configured to output an indication that the apparatus is configured to obtain the signaling according to any value of the range of values; output, for transmission, a first message comprising: one or more communication parameters associated with a first channel, the one or more communication parameters comprising a first communication parameter, and one or more ranges of values including a range of values associated with the first communication parameter; output, for transmission, a second message comprising an assigned value associated with the first communication parameter and within the range of values, the assigned value being assigned by the apparatus; and output, for transmission, a third message indicating whether the signaling is to be obtained according to the first value from the range of values or the first assigned value; e.g., as described in connection with 1102-1108 of FIG. 11.

The communication manager 1232 further includes an obtaining component 1242 configured to obtain signaling via the first channel, the signaling obtained according to a first value from the range of values; e.g., as described in connection with 1110 of FIG. 11.

The apparatus may include additional components that perform each of the blocks of the algorithm in the aforementioned flowchart of FIG. 11. As such, each block in the flowchart may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the baseband unit 1204, includes means for outputting an indication that the apparatus is configured to obtain the signaling according to any value of the range of values; means for outputting, for transmission, a first message comprising: one or more communication parameters associated with a first channel, the one or more communication parameters comprising a first communication parameter, and one or more ranges of values including a range of values associated with the first communication parameter; means for outputting, for transmission, a second message comprising an assigned value associated with the first communication parameter and within the range of values, the assigned value being assigned by the apparatus; means for outputting, for transmission, a third message indicating whether the signaling is to be obtained according to the first value from the range of values or the first assigned value; and means for obtaining signaling via the first channel, the signaling obtained according to a first value from the range of values.

The aforementioned means may be one or more of the aforementioned components of the apparatus 1202 configured to perform the functions recited by the aforementioned means. As described supra, the apparatus 1202 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Additional Considerations

Means for receiving or means for obtaining may include a receiver (e.g., receiver 318/354) and/or an antenna(s) 320/352 of the network node 102/180 and the UE 104 illustrated in FIG. 3. Means for transmitting or means for outputting may include a transmitter (e.g., 318/354) and/or an antenna(s) 320/352 of the network node 102/180 and the UE 104 illustrated in FIG. 3. Means for selecting, means for determining, and/or means for performing may include a processing system, which may include one or more processors, such as processor 375/359 of the network node 102/180 and the UE 104 illustrated in FIG. 3.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

As used herein, the terms "selecting" and/or "determining" (or any variants thereof such as "select" and "determine") encompass a wide variety of actions. For example, "selecting" and/or "determining" may include calculating, computing, processing, deriving, investigating, looking up (e.g., looking up in a table, a database or another data structure), ascertaining and the like.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Example Aspects

The following examples are illustrative only and may be combined with aspects of other embodiments or teachings described herein, without limitation.

Example 1 is a method for wireless communications performed by an apparatus, comprising: obtaining a first message comprising: one or more communication parameters associated with a first channel, the one or more communication parameters comprising a first communication parameter, and one or more ranges of values including a range of values associated with the first communication parameter; and outputting signaling to be transmitted via the first channel according to a first value from the range of values.

Example 2 is the method of example 1, wherein the range of values comprises: a contiguous sequence of multiple values including an assigned value; or a delta associated with the assigned value, the assigned value being assigned by a network node with which the apparatus communicates.

Example 3 is the method of any of examples 1 and 2, wherein the first message is a radio resource control (RRC) message, a downlink control information (DCI) message, or a medium-access control (MAC) control element (CE).

Example 4 is the method of any of examples 1-3, wherein the one or more communication parameters comprise at least one of a modulation and coding scheme (MCS), a transmit power, a transmit beam, a transmit precoder, a quasi-colocation (QCL), a transmission configuration indicator (TCI) state, or a transmit rank.

Example 5 is the method of any of examples 1-4, wherein the method further comprises: obtaining, from a network node, an indication that the network node is configured to receive the signaling output for transmission according to any value of the range of values.

Example 6 is the method of example 5, wherein the indication is part of: a master information block (MIB), a system information block (SIB), other SIBs (OSIBs), or a random-access channel message.

Example 7 is the method of any of examples 1-6, wherein the method further comprises: obtaining, from a network node, a second message comprising an assigned value associated with the first communication parameter and within the range of values, the assigned value being assigned by the network node; and obtaining, from the network node, a third message indicating whether the signaling is to be output for transmission according to the first value from the range of values or the first assigned value.

Example 8 is the method of example 7, wherein the third message is obtained via layer-1 (L1), layer-2 (L2), or layer-3 (L3) signaling.

Example 9 is the method of any of examples 7 and 8, wherein the first message and the second message are obtained via a same downlink control information (DCI).

Example 10 is the method of any of examples 7-9, wherein the second message is an uplink grant.

Example 11 is the method of any of examples 1-10, wherein the one or more communication parameters are further associated with a second channel, wherein the first channel forms at least a portion of a first logical channel group (LCG), and wherein the second channel forms at least a portion of a second LCG.

Example 12 is the method of any of examples 1-11, wherein the one or more communication parameters are further associated with a second channel, and wherein the first channel and the second channel form at least a portion of a first logical channel group (LCG).

Example 13 is the method of any of examples 1-12, wherein the first message comprises a configured grant (CG) configuration message.

Example 14 is the method of any of examples 1-13, wherein the method further comprises: obtaining mapping between indices of a downlink control information (DCI) message and values of the range of values, wherein the first value of the range of values is mapped to a first index of the DCI, and further wherein the first message comprises the DCI message; and selecting the first value if the DCI comprises the first index.

Example 15 is the method of example 14, wherein the mapping is obtained via a radio resource control (RRC) message.

Example 16 is the method of any of examples 14 and 15, wherein the indices of the DCI message are priority indices.

Example 17 is the method of any of examples 14-16, wherein the method further comprises: outputting an indication of the first value selected from the range of values prior to outputting the signaling.

Example 18 is a method of wireless communication performed by an apparatus, comprising: outputting, for transmission, a first message comprising: one or more communication parameters associated with a first channel, the one or more communication parameters comprising a first communication parameter, and one or more ranges of values including a range of values associated with the first communication parameter; and obtaining signaling via the first channel, the signaling obtained according to a first value from the range of values.

Example 19 is the method of example 18, wherein the range of values comprises: a contiguous sequence of multiple values including an assigned value; or a delta associated with the assigned value, the assigned value being assigned by the apparatus.

Example 20 is the method of any of examples 18 and 19, wherein the first message is a radio resource control (RRC) message, a downlink control information (DCI) message, or a medium-access control (MAC) control element (CE).

Example 21 is the method of any of examples 18-20, wherein the one or more communication parameters comprise at least one of a modulation and coding scheme (MCS), a transmit power, a transmit beam, a transmit precoder, a quasi-colocation (QCL), a transmission configuration indicator (TCI) state, or a transmit rank.

Example 22 is the method of any of examples 18-22, wherein the method further comprises: outputting an indication that the apparatus is configured to obtain the signaling according to any value of the range of values.

Example 23 is the method of example 22, wherein the indication is part of: a master information block (MIB), a system information block (SIB), other SIBs (OSIBs), or a random-access channel message.

Example 24 is the method of any of examples 18-23, wherein the method further comprises: outputting, for transmission, a second message comprising an assigned value associated with the first communication parameter and within the range of values, the assigned value being assigned by the apparatus; and outputting, for transmission, a third message indicating whether the signaling is to be obtained according to the first value from the range of values or the first assigned value.

Example 25 is the method of example 24, wherein the third message is obtained via layer-1 (L1), layer-2 (L2), or layer-3 (L3) signaling.

Example 26 is the method of any of examples 24 and 25, wherein the first message and the second message are obtained via a same downlink control information (DCI).

Example 27 is the method of any of examples 24-26, wherein the second message is an uplink grant.

Example 28 is the method of any of examples 18-27, wherein the one or more communication parameters are further associated with a second channel, wherein the first channel forms at least a portion of a first logical channel group (LCG), and wherein the second channel forms at least a portion of a second LCG.

Example 29 is a UE, comprising: a transceiver; a memory comprising instructions; and one or more processors configured to execute the instructions to cause the UE to perform a method in accordance with any one of examples 1-17, wherein the transceiver is configured to: receive the first message; and transmit the signaling via the first channel according to the first value from the range of values.

Example 30 is a network node, comprising: a transceiver; a memory comprising instructions; and one or more processors configured to execute the instructions and cause the network node to perform a method in accordance with any one of examples 18-28, wherein the transceiver is configured to: transmit the first message; and receive the signaling via the first channel.

Example 31 is an apparatus for wireless communications, comprising means for performing a method in accordance with any one of examples 1-17.

Example 32 is an apparatus for wireless communications, comprising means for performing a method in accordance with any one of examples 18-28.

Example 33 is a non-transitory computer-readable medium comprising instructions that, when executed by an apparatus, cause the apparatus to perform a method in accordance with any one of examples 1-17.

Example 34 is a non-transitory computer-readable medium comprising instructions that, when executed by an apparatus, cause the apparatus to perform a method in accordance with any one of examples 18-28.

Example 35 is an apparatus for wireless communications, comprising: a memory comprising instructions; and one or more processors configured to execute the instructions to cause the apparatus to perform a method in accordance with any one of examples 1-17.

Example 36 is apparatus for wireless communications, comprising: a memory comprising instructions; and one or more processors configured to execute the instructions to cause the apparatus to perform a method in accordance with any one of examples 18-28.

What is claimed is:

1. An apparatus configured for wireless communications, comprising:
- at least one memory comprising instructions; and
- one or more processors configured to execute the instructions to cause the apparatus to:
  - obtain a first message comprising:
    - a first value of a communication parameter associated with a first transmission via a first channel, the first value being assigned to the apparatus to use for the first transmission, and
    - an indication of a range of values associated with the communication parameter, the range of values including the first value and at least one other value, wherein the at least one other value is available to the apparatus to use for the first transmission as an alternative to the first value;
  - select, from the range of values, the first value or one of the at least one other value based on a communication metric associated with the apparatus; and
  - output signaling for the first transmission via the first channel according to the selected first value or the selected one of the at least one other value.

2. The apparatus of claim 1, wherein the indication of the range of values comprises:
- a contiguous sequence of multiple values; or
- a delta associated with the first value.

3. The apparatus of claim 1, wherein the first message is a radio resource control (RRC) message, a downlink control information (DCI) message, or a medium-access control (MAC) control element (CE).

4. The apparatus of claim 1, wherein;
- the communication parameter is one of a modulation and coding scheme (MCS), a transmit power, a transmit beam, a transmit precoder, a quasi-colocation (QCL), a transmission configuration indicator (TCI) state, or a transmit rank; and
- the communication metric is one of a buffer status, a quality of the first channel, or a quality of service (QoS) associated with the output signaling.

5. The apparatus of claim 1, wherein the one or more processors are further configured to cause the apparatus to:
- obtain, from a network node, an indication that the network node is configured to receive the signaling output for transmission according to any value selected by the apparatus from the range of values.

6. The apparatus of claim 5, wherein the indication is part of: a master information block (MIB), a system information block (SIB), other SIBs (OSIBs), or a random-access channel message.

7. The apparatus of claim 1, wherein the one or more processors are further configured to cause the apparatus to:
- obtain, from a network node, a second message indicating whether the signaling is to be output for transmission according to: (i) one of the at least one other value, or the first value, wherein the selection is based on the second message.

8. The apparatus of claim 7, wherein the second message is obtained via layer-1 (L1), layer-2 (L2), or layer-3 (L3) signaling.

9. The apparatus of claim 7, wherein the first message and the second message are obtained via a same downlink control information (DCI).

10. The apparatus of claim 7, wherein the second message is an uplink grant.

11. The apparatus of claim 1, wherein the communication parameter is further associated with a second channel, wherein the first channel forms at least a portion of a first logical channel group (LCG), and wherein the second channel forms at least a portion of a second LCG.

12. The apparatus of claim 1, wherein the communication parameter is further associated with a second channel, and wherein the first channel and the second channel form at least a portion of a first logical channel group (LCG).

13. The apparatus of claim 1, wherein the first message comprises a configured grant (CG) configuration message.

14. The apparatus of claim 1, wherein the one or more processors are further configured to cause the apparatus to:
- obtain mapping between indices of a downlink control information (DCI) message and values of the range of values, wherein the first value of the range of values is mapped to a first index of the DCI, wherein the first message comprises the DCI message, and wherein the selection is based on which index is indicated by the DCI message.

15. The apparatus of claim 14, wherein the mapping is obtained via a radio resource control (RRC) message.

16. The apparatus of claim 14, wherein the indices of the DCI message are priority indices.

17. The apparatus of claim 14, wherein the one or more processors are further configured to cause the apparatus to:

output an indication of the selected first value or the selected one of the at least one other value prior to outputting the signaling.

18. A user equipment (UE), comprising:

at least one transceiver;

at least one memory comprising instructions; and one or more processors configured to execute the instructions and cause the UE to:

receive, via the at least one transceiver, a first message comprising:

a first value of a communication parameter associated with a first transmission to be transmitted via a first channel, the first value being assigned to the UE to use for the first transmission, and an indication of a range of values associated with the communication parameter, the range of values including the first value and at least one other value, wherein the at least one other value is available to the UE to use for the first transmission as an alternative to the first value;

select, from the range of values, the first value or one of the at least one other value based on a communication metric associated with the UE; and transmit, via the at least one transceiver, signaling via the first channel according to the selected first value or the selected one of the at least one other value.

19. An apparatus configured for wireless communications, comprising:

at least one memory comprising instructions; and one or more processors configured to execute the instructions and cause the apparatus to:

output, for transmission, a first message comprising:

a first value of a communication parameter associated with a first transmission to be transmitted by a user equipment (UE) via a first channel, the first value being assigned to the UE to use for the first transmission, and an indication of a range of values associated with the communication parameter, the range of values including the first value and at least one other value, wherein the at least one other value is available to the UE to use for the first transmission as an alternative to the first value; and obtain signaling via the first channel, the signaling obtained according to the first value or one of the at least one other value.

20. The apparatus of claim 19, wherein the indication of the range of values comprises:

a contiguous sequence of multiple values; or a delta associated with the first value.

21. The apparatus of claim 19, wherein the first message is a radio resource control (RRC) message, a downlink control information (DCI) message, or a medium-access control (MAC) control element (CE).

22. The apparatus of claim 19, wherein the communication parameter is one of a modulation and coding scheme (MCS), a transmit power, a transmit beam, a transmit precoder, a quasi-colocation (QCL), a transmission configuration indicator (TCI) state, or a transmit rank.

23. The apparatus of claim 19, wherein the one or more processors are further configured to cause the apparatus to:

output an indication that the apparatus is configured to obtain the signaling according to any value of the range of values.

24. The apparatus of claim 23, wherein the indication is part of: a master information block (MIB), a system information block (SIB), other SIBs (OSIBs), or a random-access channel message.

25. The apparatus of claim 19, wherein the one or more processors are further configured to cause the apparatus to:

output, for transmission, a second message indicating whether the signaling is to be obtained according to: (i) one of the at least one other value, or the first value.

26. The apparatus of claim 25, wherein the second message is obtained via layer-1 (L1), layer-2 (L2), or layer-3 (L3) signaling.

27. The apparatus of claim 25, wherein the first message and the second message are obtained via a same downlink control information (DCI).

28. The apparatus of claim 25, wherein the second message is an uplink grant.

29. The apparatus of claim 19, wherein the communication parameter is further associated with a second channel, wherein the first channel forms at least a portion of a first logical channel group (LCG), and wherein the second channel forms at least a portion of a second LCG.

30. The apparatus of claim 19, further comprising at least one transceiver configured to:

transmit the first message; and receive the signaling via the first channel, wherein the apparatus is configured as a network node.

* * * * *